US012796580B2

(12) United States Patent
Sipper et al.

(10) Patent No.: US 12,796,580 B2
(45) Date of Patent: Nov. 17, 2026

(54) SAND GROOMING VEHICLE WITH ONE TOUCH LIFT AND LOWER RAKE

(71) Applicant: Deere & Company, Moline, IL (US)

(72) Inventors: Zackary P. Sipper, Raleigh, NC (US); Stanley K. Hall, Godwin, NC (US); Shawn M. Driesbaugh, Cary, NC (US); Thirumal Appaian, Dasanaikkanpatti (IN); Thomas A. Hughes, Jr., Fuquay-Varina, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/042,064

(22) Filed: Jan. 31, 2025

(65) Prior Publication Data

US 2026/0223759 A1 Aug. 6, 2026

(51) Int. Cl.
*A01B 35/14* (2006.01)
*A01B 63/28* (2006.01)

(52) U.S. Cl.
CPC .............. *A01B 35/14* (2013.01); *A01B 63/28* (2013.01)

(58) Field of Classification Search
CPC ................................ A01B 35/14; A01B 63/28
See application file for complete search history.

(56) References Cited

U.S. PATENT DOCUMENTS

| | | | | |
|---|---|---|---|---|
| 5,890,545 | A | 4/1999 | Smith et al. | |
| 7,464,528 | B1 | 12/2008 | Street et al. | |
| 10,046,214 | B2 | 8/2018 | Schmidt et al. | |
| 10,883,235 | B2 | 1/2021 | Norstad et al. | |
| 2007/0095549 | A1 | 5/2007 | Modzik | |
| 2011/0288729 | A1 | 11/2011 | Mckinney | |
| 2014/0262387 | A1* | 9/2014 | Schmidt | A63B 57/50 172/663 |
| 2019/0216000 | A1* | 7/2019 | Hiller | E01H 5/061 |
| 2019/0389519 | A1* | 12/2019 | Bergsten | B62D 49/0671 |

(Continued)

FOREIGN PATENT DOCUMENTS

| | | | |
|---|---|---|---|
| EP | 1495661 | A1 | 1/2005 |
| EP | 4480291 | A1 | 12/2024 |

(Continued)

OTHER PUBLICATIONS

John Deere 8R 3 Point Hitch Controls Explained, Western Equipment, Sep. 18, 2024 https://www.youtube.com/watch?v=f7iHl45aLeA.*

(Continued)

*Primary Examiner* — Brian P Sweeney

(57) ABSTRACT

Provided are devices, systems, and methods related to a sand grooming vehicle having a rake that may move between various positions and a one-touch user input configured to allow a user to request the rake to move to a predetermined position with a single actuation. The sand grooming vehicle also includes a vehicle control unit with at least one memory and processor. The vehicle control unit is capable of storing predetermined rake positions, detecting actuation of the one-touch user input, and commanding the rake to move to the predetermined position without requiring the user to continue actuating the input. In some implementations, the predetermined rake position may be a specific rake height.

18 Claims, 10 Drawing Sheets

(56) References Cited

U.S. PATENT DOCUMENTS

| | | | |
|---|---|---|---|
| 2023/0097563 | A1 | 3/2023 | Sahoo et al. |
| 2025/0000017 | A1 | 1/2025 | Christopher |

FOREIGN PATENT DOCUMENTS

| | | | |
|---|---|---|---|
| JP | 2003189709 | A | 7/2003 |
| JP | 2013027336 | A | 2/2013 |
| JP | 2015224567 | A | 12/2015 |
| WO | WO 2019143655 | A1 | 7/2019 |

OTHER PUBLICATIONS

Great Britain Combined Search and Examination Report issued in application No. GB2516926.9 dated Apr. 13, 2026, 08 pages.
Great Britain Combined Search and Examination Report issued in application No. GB2514954.3 dated Mar. 6, 2026, 10 pages.
Great Britain Combined Search and Examination Report issued in application No. GB2515264.6 dated Mar. 6, 2026, 08 pages.

* cited by examiner

SAND GROOMING VEHICLE WITH ONE TOUCH LIFT AND LOWER RAKE

TECHNICAL FIELD

The present disclosure relates to utility rakes, also called bunker rakes, and more specifically to systems, devices, and methods for utility rakes having automated rake lift features.

BACKGROUND

A sand grooming vehicle, sometimes referred to as a utility rake, utility rake vehicle, bunker rake, or a bunker rake vehicle, may be used to groom an area covered in sand or a similar material. Such machines may be used on golf courses to groom sand bunkers. Such machines may also be used in other applications, such as for a sports infield. The sand grooming vehicle may be a self-propelled machine that includes a rake, which may include one or more rake sections. The rake may be located at or near the rear of the sand grooming vehicle.

SUMMARY

In one aspect of the invention, a sand grooming vehicle includes a rake movable between a plurality of positions, a one-touch user input configured to request movement of the rake to a predetermined rake position upon actuation by a user, and a vehicle control unit including at least one memory and at least one processor. The vehicle control unit may be operable to store at least one predetermined rake position, detect actuation of the one-touch user input, and command movement of the rake to the predetermined rake position without continued actuation of the one-touch user input by the user. The rake position may be a rake height. The vehicle may further include a plurality of one-touch user inputs configured to request movement of the rake to a corresponding plurality of predetermined rake heights. The vehicle control unit may be operable to detect actuation of each of the plurality of one-touch user inputs and command movement of the rake to each of the corresponding predetermined rake heights upon actuation of the corresponding one of the plurality of one-touch user inputs without continuous actuation. The rake height associated with the one-touch user input may be configured to be changeable by a user. An actuator may move the rake between the plurality of positions. The actuator may be an electric actuator in communication with the vehicle control unit via a controller area network (CAN) bus.

In another aspect of the invention, a vehicle is provided including a rake movable between a plurality of heights, a plurality of one-touch user inputs configured to request movement of the rake to a corresponding plurality of predetermined rake heights upon actuation by a user, and a vehicle control unit. The vehicle control unit may be operable to store the plurality of predetermined rake heights, detect actuation of each of the plurality of one-touch user inputs, and command movement of the rake to a user-selected predetermined rake height without continued actuation of the one-touch user input. The rake height associated with at least one of the one-touch user inputs may be configured to be changeable by a user. An actuator may move the rake between the plurality of heights. The actuator may be an electric actuator in communication with the vehicle control unit via a controller area network (CAN) bus.

In yet another aspect of the invention, a computer-implemented method of controlling a sand grooming vehicle may include storing one or more predetermined rake positions, detecting a one-touch user input request to move the rake to a predetermined rake position, and commanding movement of the rake to the predetermined rake position without continued detection of the one-touch user input request. The method may further include analyzing whether the sand grooming vehicle is traveling in reverse upon detecting a one-touch user input request. The method may also include detecting a user-inputted reverse request, determining whether continuing to command movement of the rake to said predetermined rake position will result in a rake position that meets a minimum height, and if continuing to command movement of said rake to said predetermined rake position will not result in a rake position that meets said minimum height, commanding movement of said rake to said minimum height instead of to said predetermined rake position.

BRIEF DESCRIPTION OF THE DRAWINGS

The detailed description of the drawings refers to the accompanying figures.

Like reference numerals are used to indicate like elements throughout the several figures.

DETAILED DESCRIPTION

The following is a detailed description of one or more embodiments of technology, including systems, methods, and apparatuses, for a sand grooming vehicle, also referred to as a utility rake vehicle.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., may be used descriptively for the figures, and do not represent limitations on the scope of the disclosure, as defined by the appended claims. Moreover, sometimes terms such as "above," "below," "upward," "downward," "top," "bottom," etc., may also be used in connection with describing an apparatus as it is oriented when it sits on the ground in its customary operating mode. However, these terms are again used for description purposes and do not represent limitations on the scope of the disclosure, unless required by the claims. In addition, terms such as "forward", "rear", and "side" may be used relative to the typical direction of forward travel of an apparatus. These terms are used for description purposes and do not represent limitations on the scope of the disclosure, unless required by the claims.

Terms of degree, such as "generally", "substantially", or "approximately" are understood by those of ordinary skill to refer to reasonable ranges outside of a given value or orientation, for example, general tolerances or positional relationships associated with manufacturing, assembly, and use of the described embodiments.

Figure 1:
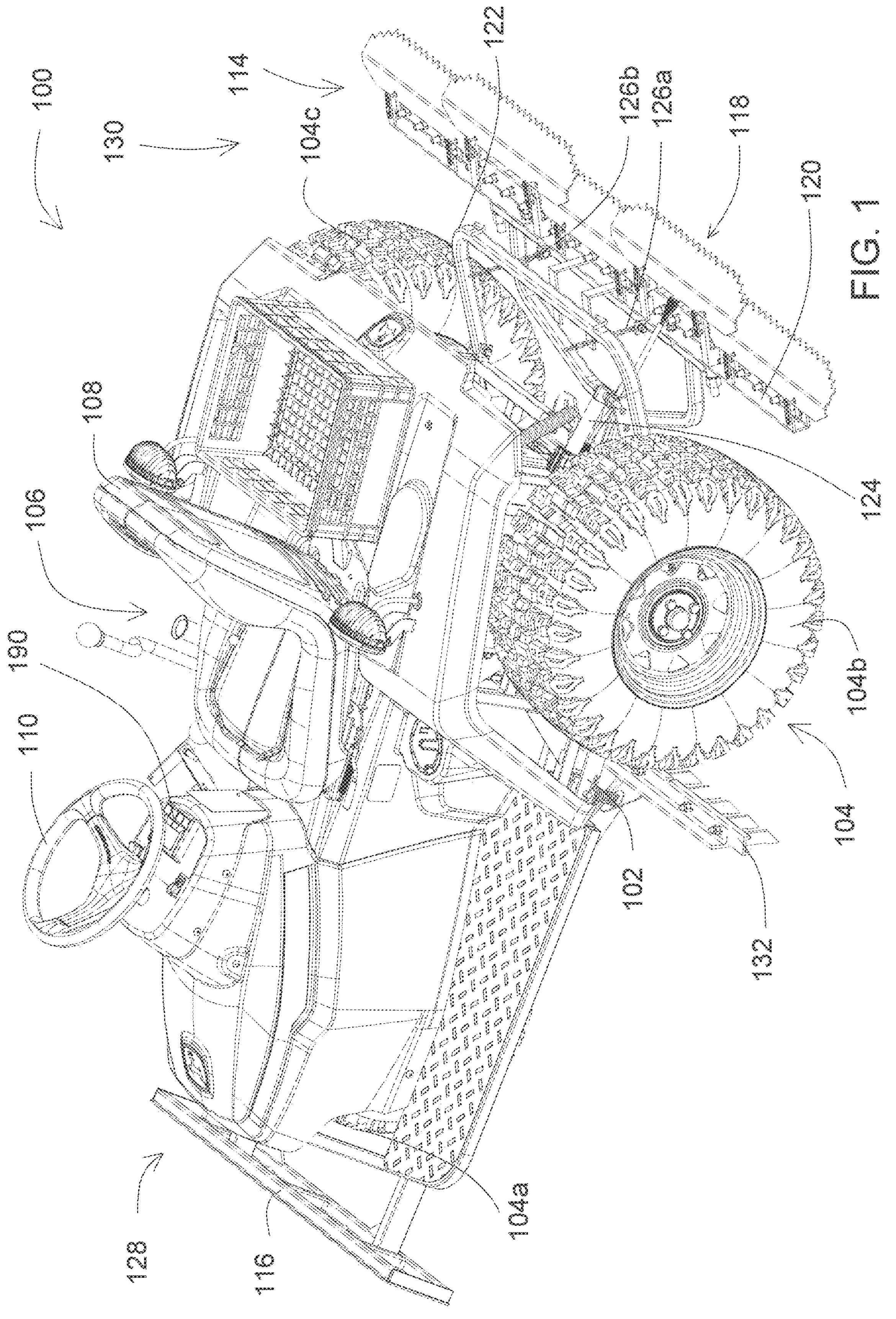
FIG. 1 is a perspective view of an implementation of a sand grooming vehicle of the present invention.

Referring to FIG. 1, an implementation of a sand grooming vehicle 100 of the present invention is provided. The sand grooming vehicle 100 may include a frame 102 (best seen in FIG. 3) supported by one or more ground engaging members 104. In the illustrated embodiment, three ground engaging members 104 are provided: a front wheel 104*a*, a left rear wheel 104*b*, and a right rear wheel 104*c*. Sand grooming vehicle 100 may include a front 128 and a rear 130. Sand grooming vehicle may further include a rake 114, illustrated as extending from at or near the rear 130 of the sand grooming vehicle 100. Moreover, the sand grooming vehicle 100 may include a blade 116, such as at or near the front 128 of the sand grooming vehicle 100. Sand grooming vehicle 100 may include a mid-rake 132.

Figure 2:
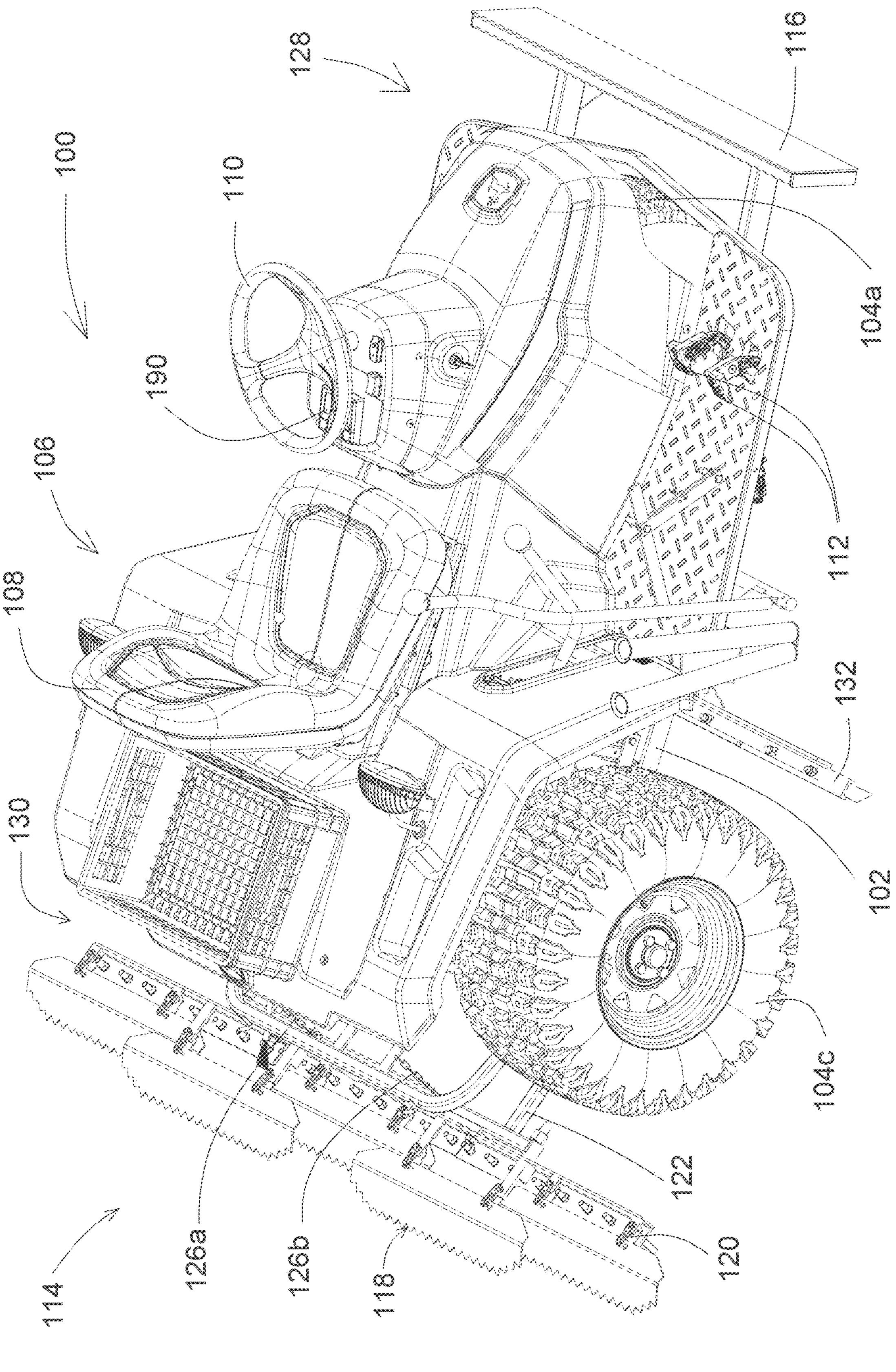
FIG. 2 is a perspective view of the sand grooming vehicle of FIG. 1 showing further detail of an operator station.

Referring to FIG. 2, the sand grooming vehicle 100 may include an operator station 106. The illustrated operator station 106 may include a seat 108, at least one steering device 110, and one or more user input devices. It will be understood by one of skill in the art that the terms "operator" and "user" may be used interchangeably herein. In the illustrated implementation, the steering device 110 is a steering wheel; however, one or more steering devices of any type may be used. For example, one or more steering levers may be used. Moreover, the operator station 106 may include at least one foot pedal 112, such as a foot pedal that is used by an operator to request an increase or decrease in the speed of the sand grooming vehicle 100 and/or a foot pedal to activate a brake. Also included may be foot pedals for the operator to request forward or reverse movement by the vehicle's traction system. The operator station may also include one or more user-actuated controls to control one or more features of the sand grooming vehicle 100. To that end, operator station 106 may include a screen 190.

Figure 3:
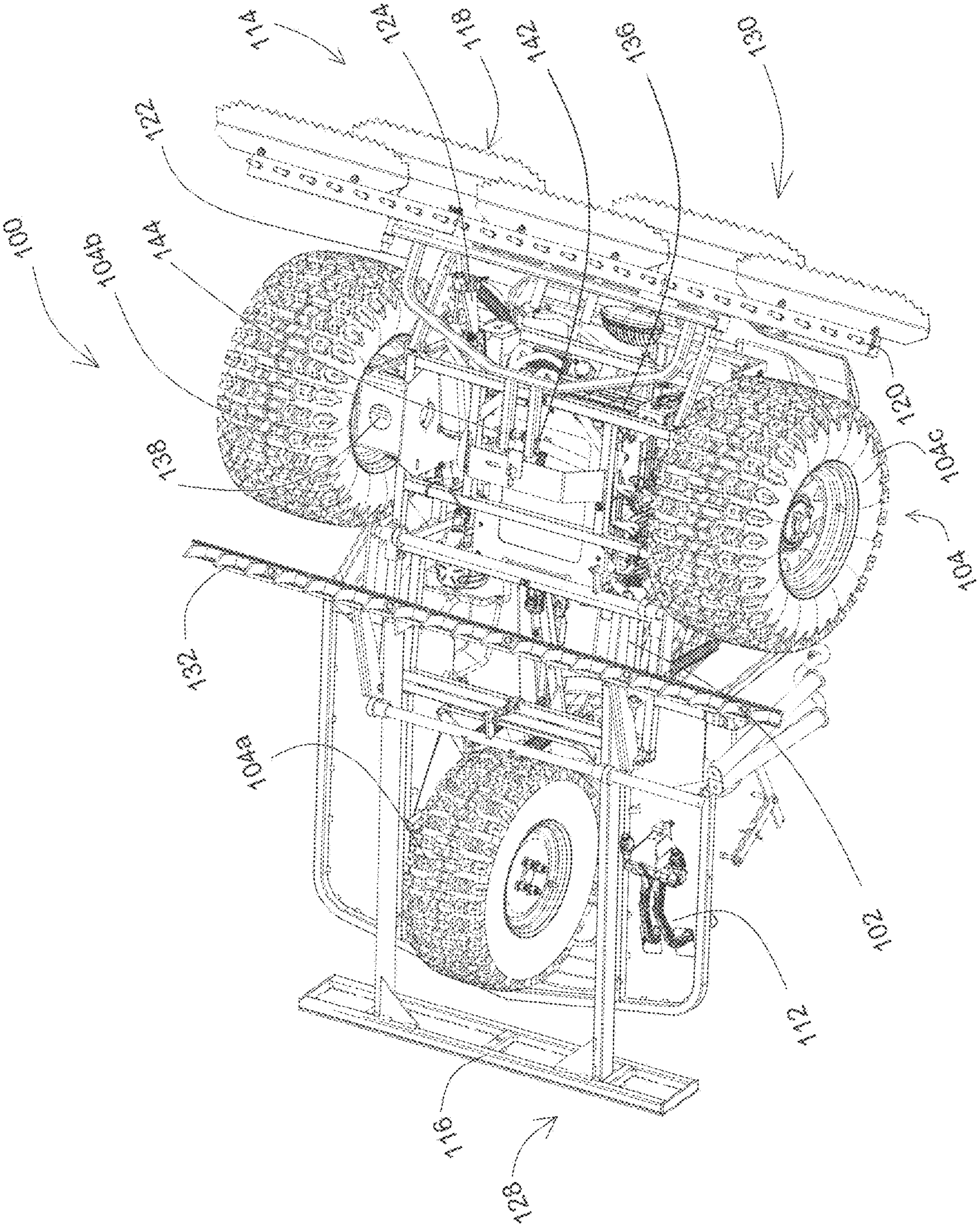
FIG. 3 is a perspective view showing the underside of the sand grooming vehicle of FIGS. 1 and 2.

A sand grooming vehicle 100 of the present invention may include a power source. As shown in FIG. 3, the illustrated power source is a battery 136. Sand grooming vehicle 100 may further include a traction system. Traction system may include one or more user inputs to request changes in the speed and/or direction of the vehicle, including but not limited to steering wheel 110 and/or foot pedals 112 described in operator station 106. Traction system may also include one or more traction motors 138, which may each be configured to drive traction wheels 104*b*, 104*c*, respectively. Traction system may also include VCU 200, described in more detail below, which may receive inputs and send commands.

Referring to FIG. 3, a perspective view of the underside of a sand grooming vehicle 100 of the present invention is shown. Shown is the rake 114, which may include one or more rake sections. The illustrated embodiment includes five rake sections 118. The rake sections 118 may extend from a rake frame 120. The rake frame 120 may be joined to one or more rake supports 122. Rake support(s) 122 may be directly or indirectly connected to frame 102. Frame supports 122 may be configured to be movable. For example, frame supports 122 may be configured to be pivotable with respect to frame via joints 142, 144. Also shown in FIG. 3 is a lift actuator 124. The lift actuator 124 is configured to cause the rake 114 to move between two or more positions. The lift actuator 124 may be an electric actuator. An electric lift actuator 124 may be capable of determining its position or height and/or sending same to a controller. The rake 114 may further be connected to frame 102, either directly or indirectly, via one or more chains 126 (shown in FIGS. 1 and 2). In the illustrated embodiment, two chains 126*a*, 126*b* are shown (shown in FIGS. 1 and 2). Other lift actuators may be used without departing from the scope of the invention, including but not limited to a hydraulic lift actuator.

Figure 4:
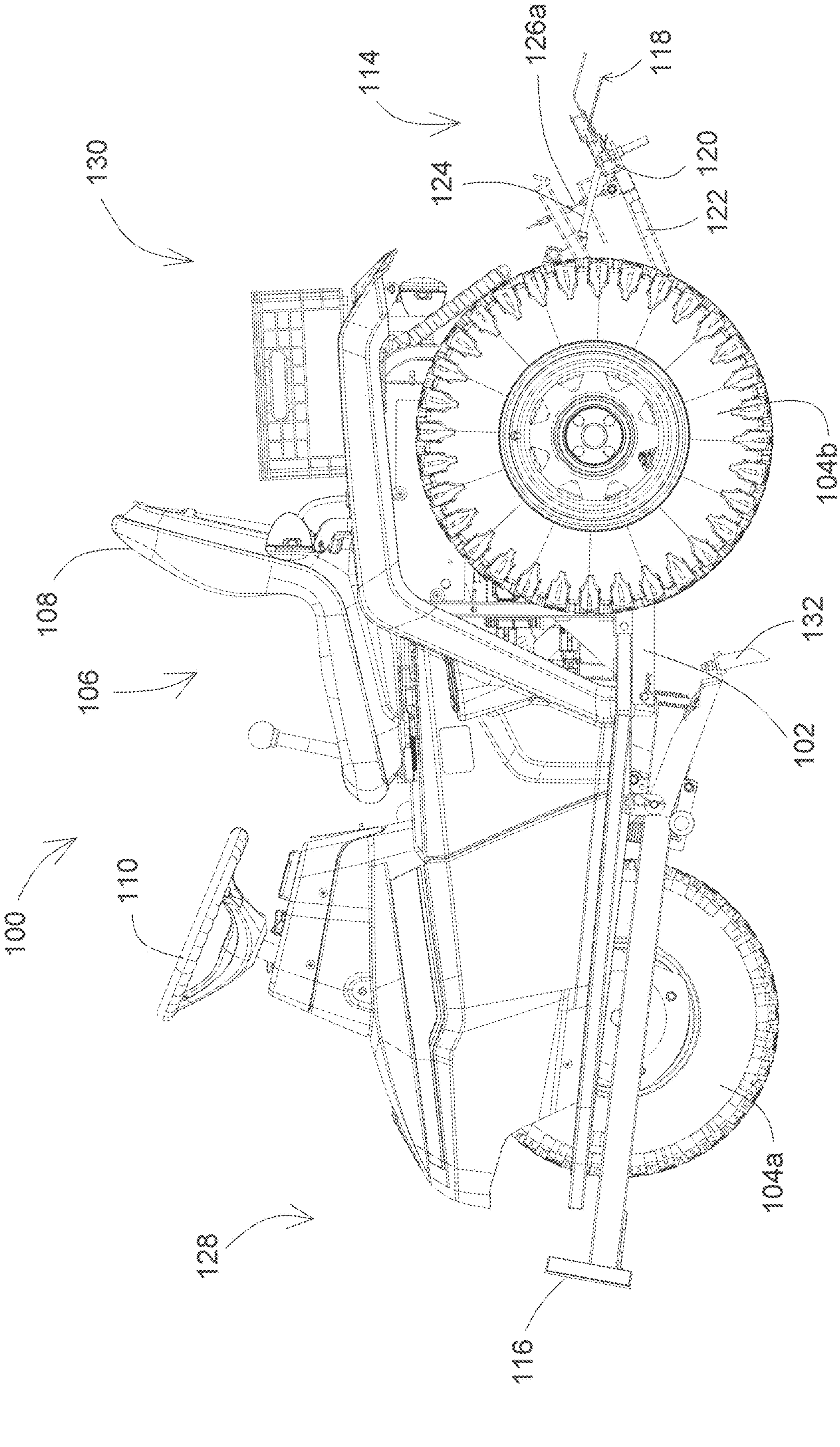
FIG. 4 is a side view of the sand grooming vehicle of FIGS. 1-3 wherein a rake is in a raised position.
Figure 5:
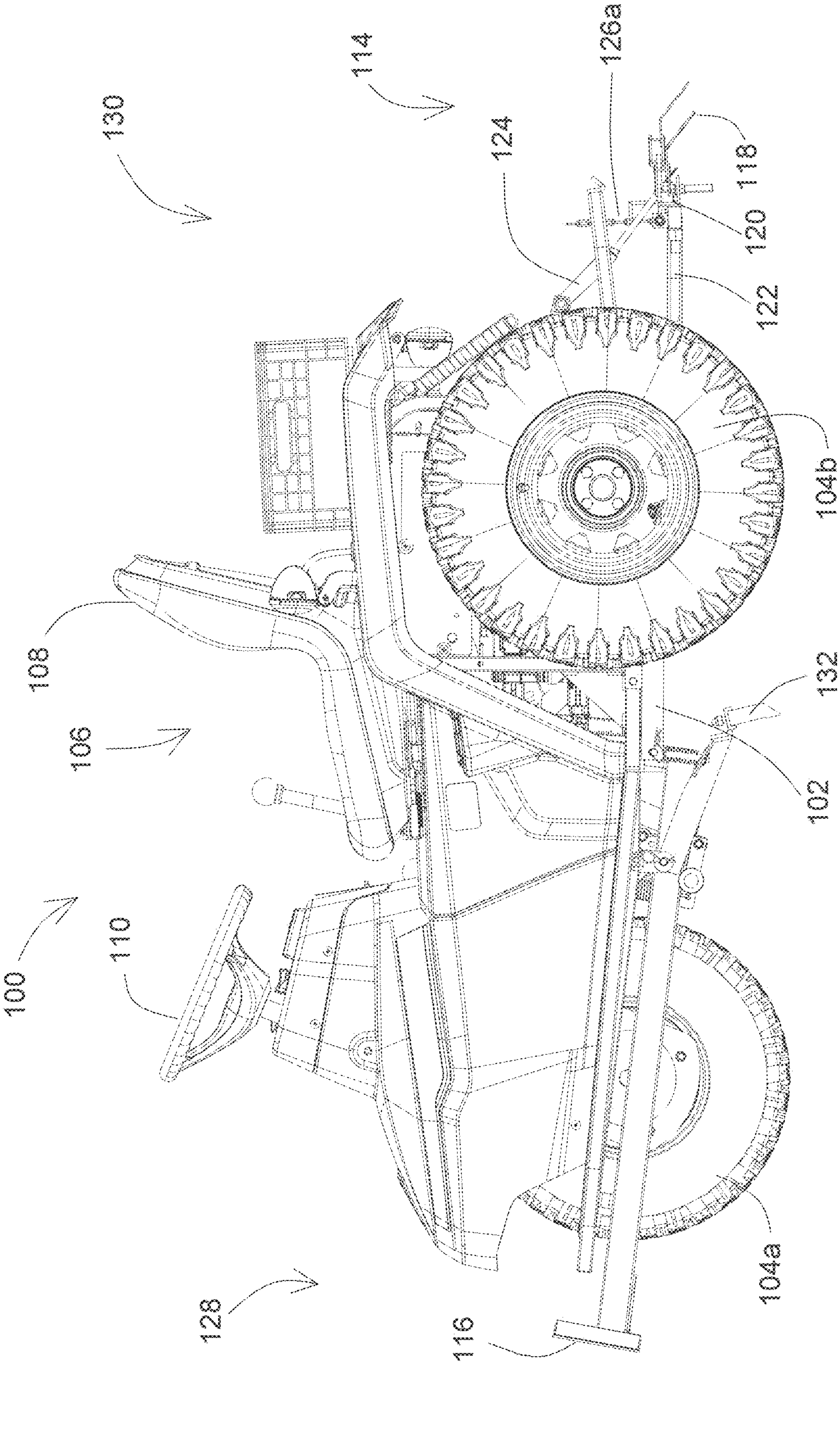
FIG. 5 is a side view of the sand grooming vehicle of FIGS. 1-4 wherein the rake is in an intermediate position.
Figure 6:
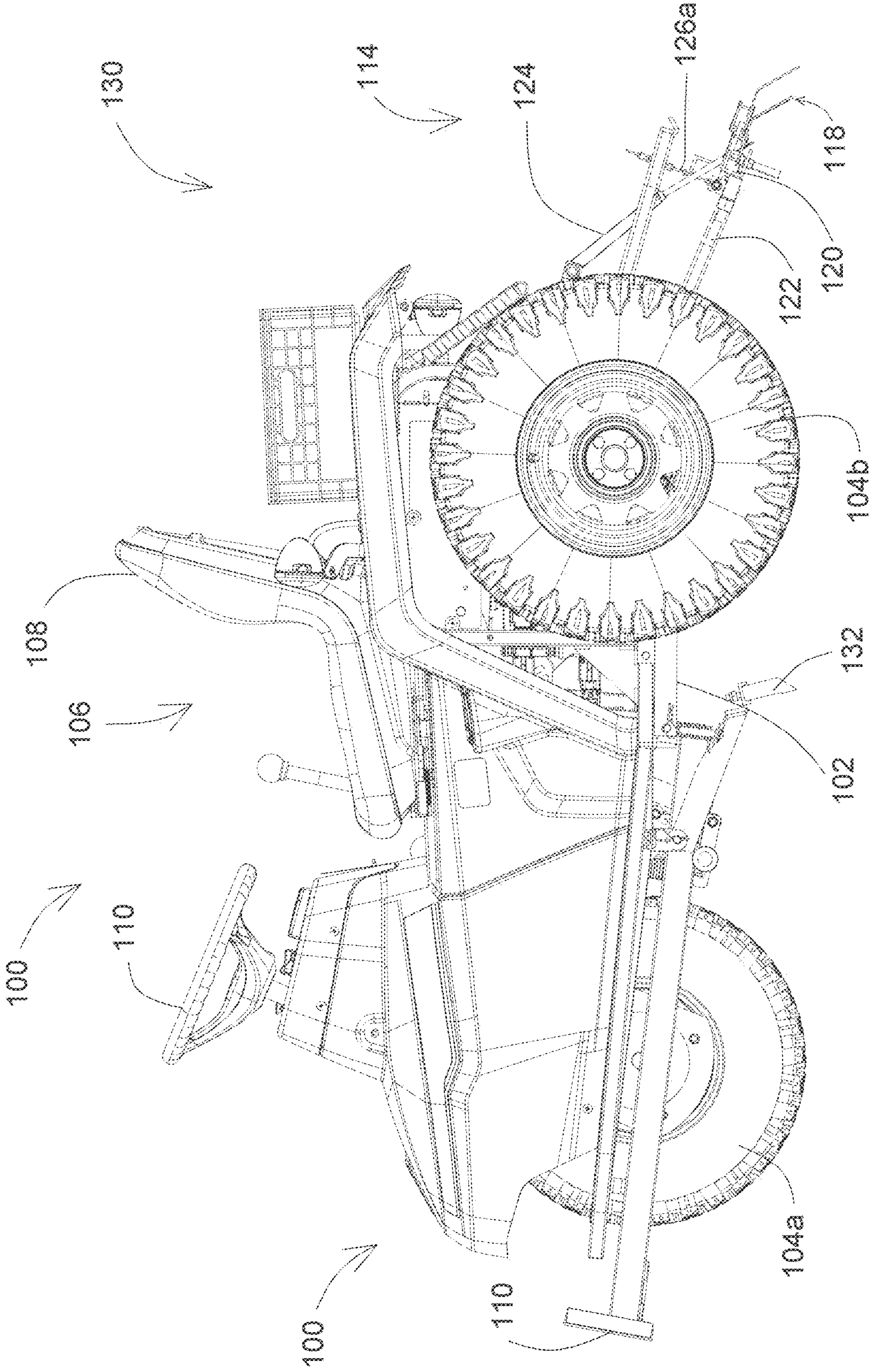
FIG. 6 is a side view of the sand grooming vehicle of FIGS. 1-5 wherein the rake is in a lowered position.

Rake 114 is movable between two or more positions. As noted above, lift actuator 124 may effect movement of rake 114. FIGS. 4-6 illustrate the rake in a plurality of positions. FIG. 4 shows sand grooming vehicle 100 with rake 114 in a raised position. FIG. 5 shows sand grooming vehicle 100 wherein rake 114 is in an intermediate position, which is lower than the raised position illustrated in FIG. 4. FIG. 6 shows sand grooming vehicle 100 wherein rake 114 is in a lowered position, which is lower than both positions shown in FIGS. 4 and 5. The rake 114 positions shown in FIGS. 4-6 are exemplary only. Rake 114 may be movable to and between any position within its range of motion. Moreover, rake 114 may have any range of motion.

Figure 7:
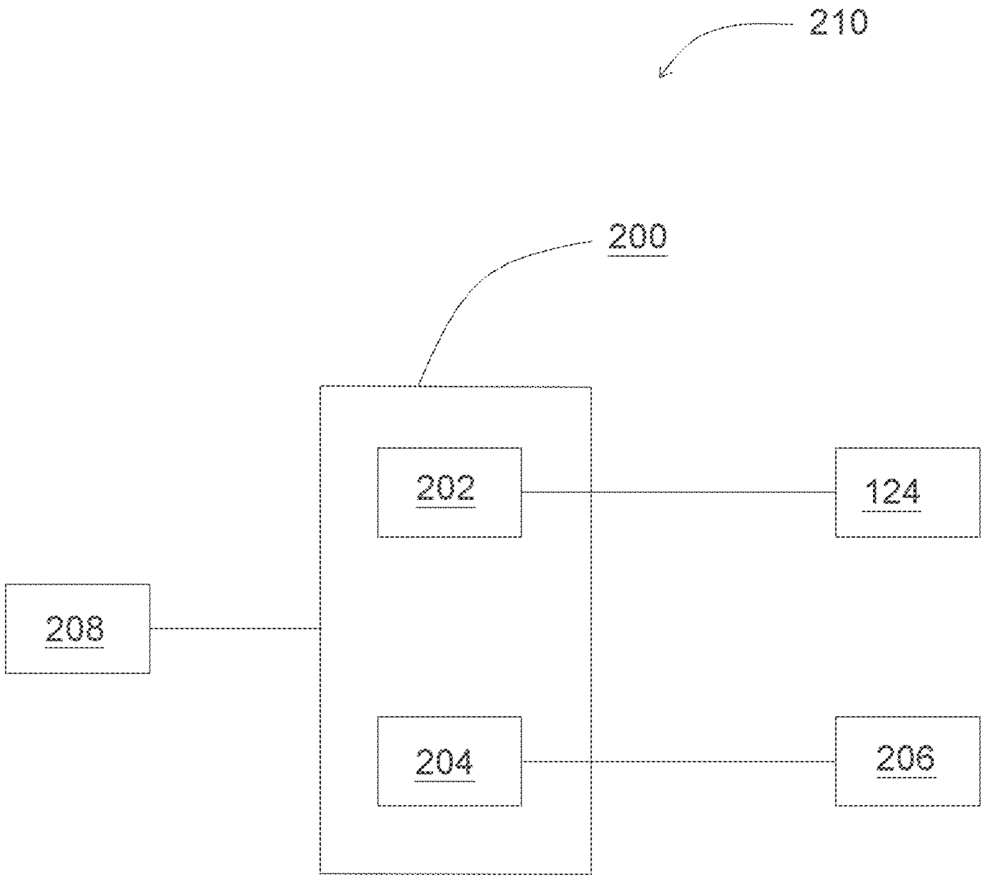
FIG. 7 is a diagram of a portion of an implementation of a sand grooming vehicle of the present invention

A sand grooming vehicle 100 of the present invention may have one or more electronic control systems or components. Referring to FIG. 7, a first implementation of an exemplary control system 210 of a sand grooming vehicle 100 of the present invention is shown. Control system 210 may include a vehicle control unit (sometimes "VCU") 200. The VCU 200 may be configured to electronically control the operation of one or more components of sand grooming vehicle 100. VCU 200 may be any suitable processor-based device known in the art, such as a computing device or any suitable combination of computing devices. The VCU 200 may include at least one memory 202 and at least one processor 204. The memory 202 and the processor 204 may be communicatively coupled. The memory 202 communicates with the processor 204 and is used to store programs and other software and information (such as in the form of data or instructions). The processor 204 is operable to execute programs and software and receive information and send information to the memory 202. Although a single memory 202 and a single processor 204 are illustrated, in some implementations, a plurality of memories, processors, or both may be used. Although the processor 204 and memory 202 are shown as being local components of the VCU 200, one or both of the processor 204 and memory 202 may be located remotely. VCU 200 may be configured to perform a variety of computer-implemented functions, including those described herein.

VCU 200 may be in communication with lift actuator 124. The VCU 200 may receive information from lift actuator 124, including but not limited to a position of the lift actuator 124. VCU 200 may send information to lift actuator 124, including but not limited to command signal(s) to raise and/or lower rake 114. VCU 200 may also be in communication with vehicle traction system 206. The traction system 206 may be responsible for the direction and/or speed of travel of the vehicle 100. Electronic components of the vehicle 100, including but not limited to the VCU 200, lift actuator 124, and/or traction system 206 may be in communication via a network. In one or more embodiments, a CAN (controller area network) may be used.

A sand grooming vehicle 100 may include devices, systems, and/or networks directed to a position of rake 114. In some implementations, a position of the rake may relate to the height of the rake 114, such as those shown above in FIGS. 4-6. In some situations, the sand grooming vehicle 100 may traverse ground that is not level. For example, the ground of a golf bunker on a golf course may be sloped such that the middle of the bunker is lower in elevation than the sides, which may slope up to the boundary or edge of the bunker. If the rake 114 is not at an appropriate height, the rake can collide with the ground (sand, grass, or other), which may have undesirable effects, including but not limited to undesirable grooming in the sand, damage to the ground, and/or damage to the sand grooming vehicle 100. Accordingly, in one or more implementations of systems, devices, and methods of the present invention, the sand grooming vehicle 100 may be able to ascertain the height of the rake 114. The lift actuator 124 may be electric. In some implementations, the lift actuator 124 determines its position and sends same to the VCU 200. In some implementations, the lift actuator 124 may include one or more sensors. For example, the lift actuator 124 may include two Hall effect sensors. In other implementations, the lift actuator 124 may include a potentiometer to measure its position. Moreover, in some implementations, the lift actuator 124 may include an encoder. The encoder may format actuator information, including but not limited to information related to actuator position, such that it may be used by VCU 200. In some implementations, the lift actuator 124 may be capable of dual channel feedback. In some implementations, the sensor (s) and encoder(s) are internal to the actuator 124, although other configurations may be used.

Figure 8:
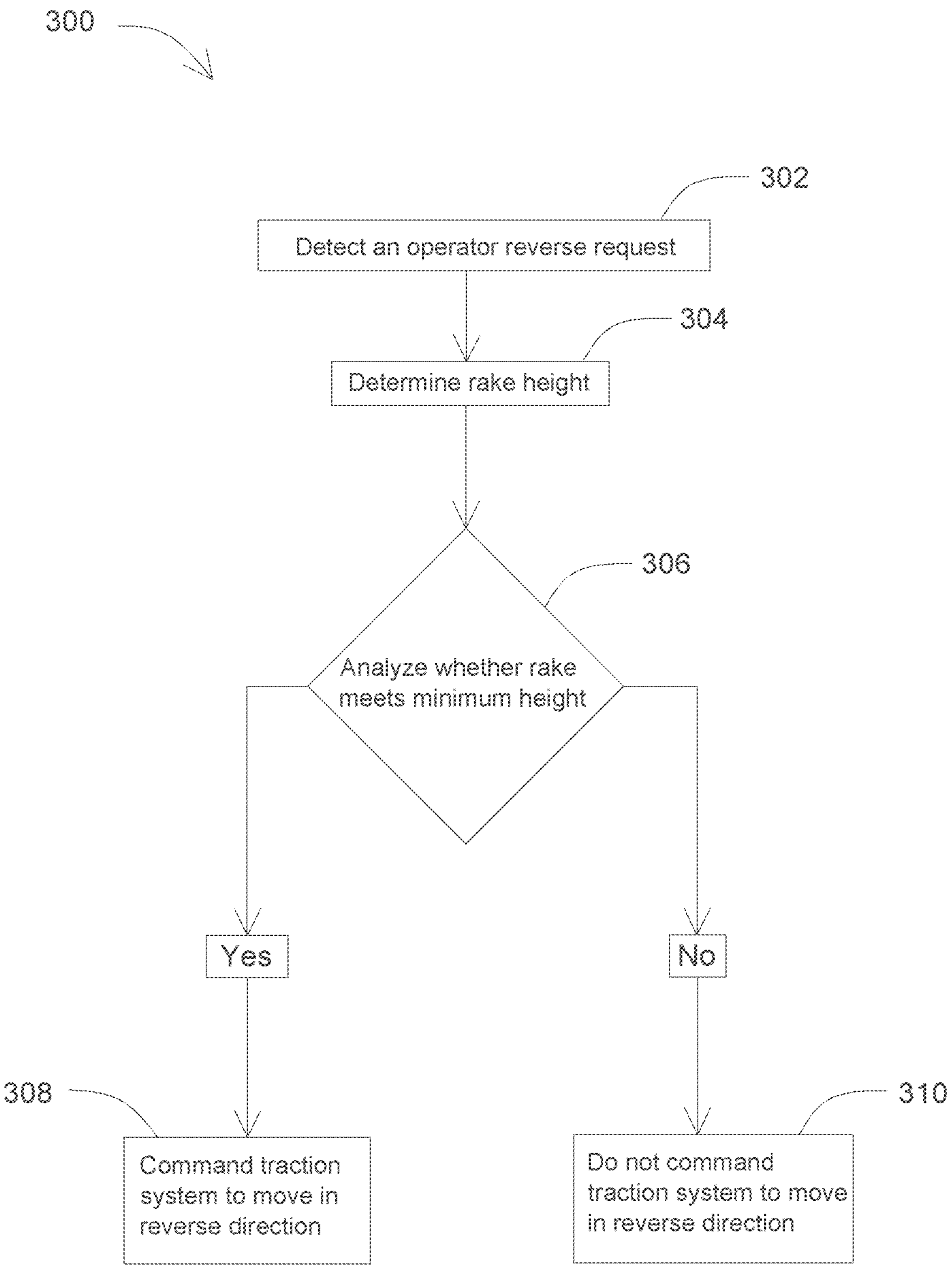
FIG. 8 is flow chart of an implementation of a method for a sand grooming vehicle reverse interlock of the present invention.
Figure 9:
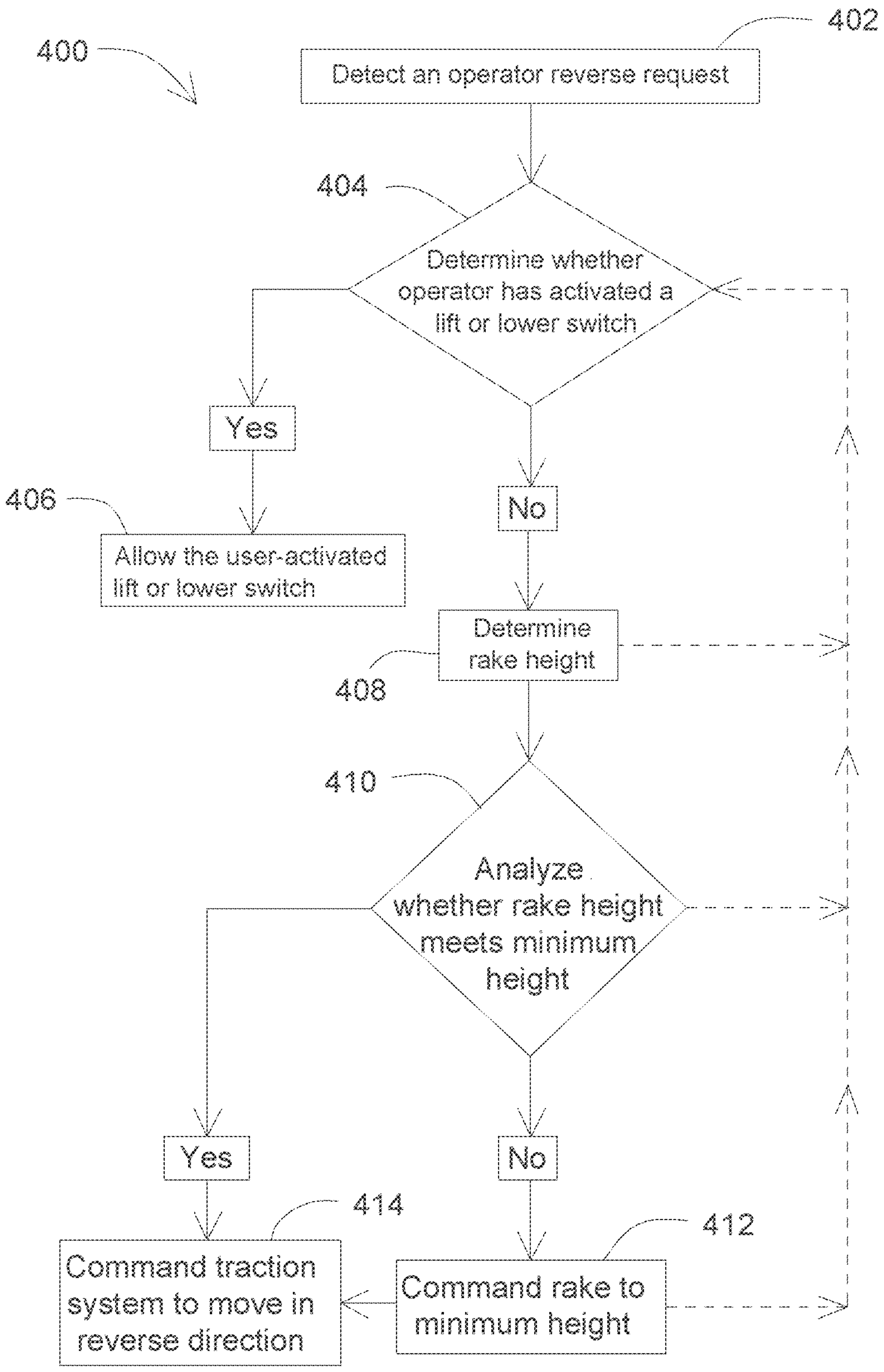
FIG. 9 is a flow chart of an implementation of a method for automated lifting and/or lowering of a rake of a sand grooming vehicle of the present invention.

In one or more implementations of a sand grooming vehicle 100 of the present invention, the vehicle 100 may be prevented from traveling in reverse if the rake 114 is in a position where travel in reverse would cause undesirable effects, as described above. In one or more implementations, the VCU 200 may prevent the sand grooming vehicle 100 from moving in reverse if the rake 114 does not meet a minimum height off the ground. Referring to FIG. 8, an implementation of a method for a sand grooming vehicle reverse interlock 300 is provided. In one step of such a method 300, an operator reverse request may be detected 302. A reverse request may be user inputted, such as by an operator instructing the sand grooming vehicle 100 to move in reverse. In one or more implementations, a user-actuated reverse pedal may be used. In some implementations, the VCU 200 may detect the request. In another step of the method 300, the rake height may be determined 304. As noted above, the lift actuator 124 may detect its position and transmit same to the VCU 200. The lift actuator 124 may be configured to continuously detect its position, detect its position periodically, or a combination thereof. Lift actuator 124 may be configured to continuously transmit its position, transmit its position periodically, or a combination thereof.

The height of the rake 114 may be analyzed to determine whether the sand grooming vehicle 100 may safely move in reverse without risk undesirable effects, including but not limited to damage to or from the rake 114. This is shown in step 306. Such an analysis may include a threshold height, at and/or above which the sand grooming vehicle 100 may move in reverse and at and/or below which the sand grooming vehicle 100 may not move in reverse. Accordingly, the threshold height may be a minimum height. Such a threshold height may be set by a manufacturer and/or configured by an operator. Such analysis may be performed by the VCU 200.

If the rake is at or above the threshold height, the traction system 206 may be commanded to move in a reverse direction 308, such as by the VCU 200. If the rake is below a threshold height, the traction system 206 may be commanded not to move in a reverse direction 310. For example, the traction system 206 may be commanded to stop the sand grooming vehicle 100 and/or keep the sand grooming vehicle 100 at a stop. The VCU 200 may command the sand grooming vehicle 100 not to move in a reverse direction. Variations to the above method may be made without departing from the scope of the invention. In one nonlimiting example, a rake 114 at the threshold height may result in the sand grooming vehicle 100 not moving in a reverse direction.

In one or more implementations, a sand grooming vehicle 100 of the present invention may include systems, methods, and/or devices related to automated lift and/or lower of the rake 114. Referring to FIG. 8, an example of an implementation of a method of automatically lifting a rake 400 is provided. In one step of such a method 400, an operator-inputted reverse request may be detected 402. An operator may request reverse in any way, such as via a foot pedal, shift lever, button, switch, etc. In another step of such a method 400, it is determined whether an operator has requested lifting or lowering of the rake 404 via an operator input. An operator-inputted lift or lower request may be any type, including but not limited to a foot pedal, shift lever, button, switch, etc. A step of determining whether an operator has requested lifting or lowering of the rake may be performed by VCU 200. If it is determined that an operator has requested lifting or lowering of the rake, such manual lifting or lowering may be commanded consistent with the operator request, as shown in step 406. For example, the VCU 200 may command lifting or lowering of the rake consistent with the operator request.

If it is determined that an operator has not requested lifting or lowering of the rake, rake height may be determined, as shown in step 408. For example, the VCU 200 may determine the rake height based on information received from lift actuator 124, as discussed above. Another step of the method may include analyzing whether the rake height meets a minimum height 410. The VCU 200 may perform this analysis. If the rake height does not meet a minimum height, the rake may be commanded to a new height, such as the minimum height, as shown in step 412. Such a command may be by the VCU 200 to the lift actuator 124. The reverse request may then be allowed 414, such as commanded by the VCU 200 consistent with the operator request. If the result of the step 410 analysis of whether the rake height meets a minimum height is that the rake does meet a minimum height, the reverse request may be commanded by the VCU, as shown in step 414. Accordingly, the vehicle may be commanded to travel in reverse, consistent with the operator request.

In other implementations of a method to automatically raise the rake, the VCU need not be in communication with the traction system. In such a method, the VCU may receive input of a reverse request by an operator, for example through a sensor on a pedal or other user-actuated mechanism for inputting a reverse request. The method may include detecting a reverse request; determining whether an operator has commanded the rake to lift or lower; if yes, allowing the operator request; if no, determining rake height; analyzing whether the rake meets a minimum height; if no, commanding the rake to at least a minimum height; and if yes, taking no action with respect to rake height. In such a method, the operator-inputted reverse request would not need to be requested by the VCU. Rather, the operator-inputted reverse request would occur as inputted by the operator, and the rake height would be adjusted as determined and commanded by the VCU.

In other implementations of methods related to sand grooming vehicle 100, if an operator has manually inputted a rake 114 lower request resulting in an active lift actuator 124, the lift actuator may be commanded to stop if the user inputs a reverse request. In other implementations of methods related to sand grooming vehicle 100, when a user enters a rake lower input, the VCU 200 may analyze whether the vehicle 100 is operating in reverse and/or begins to receive a reverse input from an operator. In such situations, if the vehicle is in reverse and/or begins to receive a reverse input, the VCU 200 may not allow the lower request and/or carry out steps to confirm that lowering the rake may be done without damaging the ground and/or vehicle 100.

In some implementations of a sand grooming vehicle 100 of the present invention, after the rake 114 has been automatically raised consistent with a method for automated rake lift 400 described above and in FIG. 8, the rake 114 may be automatically returned to its position prior to being automatically raised. In such a method, after the operator ceases requesting a reverse direction, including but not limited to by requesting a forward direction, the VCU 200 may automatically command the rake actuator 124 to return to its position prior to being automatically raised. In such a method, the VCU 200 may store in memory 202 data and/or information related to the position of the rake 114 prior to a reverse request that prompted the automatic lifting of the rake. Upon the reverse command ending, the VCU 200 may command the lift actuator 124 to move the rake 114 to the previous position. In some implementations, the VCU 200 may command the lift actuator 124 to move the rake 114 to the previous position upon detection of an operator-inputted forward request. In such a method, the VCU 200 may cease commanding movement of the lift actuator 124 upon a user-inputted request to raise and/or lower the rake 114 to a user inputted position. Accordingly, in some implementations, an operator may override an automatic return of the rake 114 to its prior position.

Figure 10:
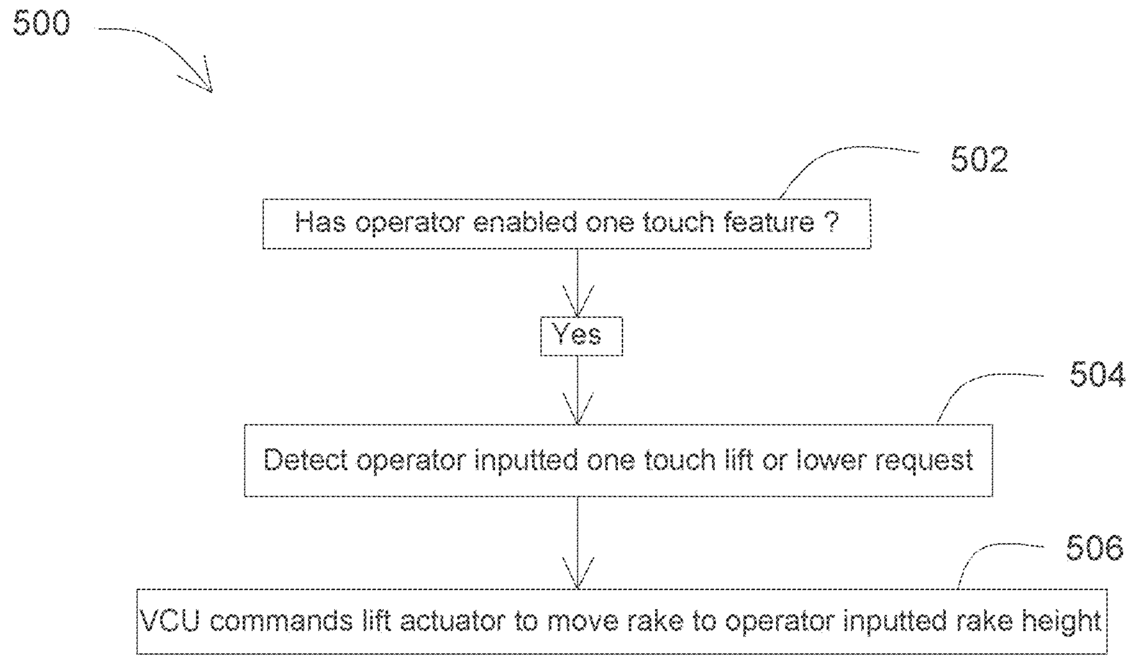
FIG. 10 is a flow chart of an implementation of a method for one touch lifting and/or lowering of a rake of a sand grooming vehicle of the present invention.

One or more implementations of a sand grooming vehicle 100 of the present invention may include systems, methods, and devices related to one touch lifting and/or one touch lowering of the rake 114. Referring to FIG. 10, a method for one touch lift and/or lower of a rake 500 is provided. The method may include a step of determining whether a one touch lift and/or lower feature has been enabled 502. Enablement of such a feature may be operator inputted. Such an operator input may be any type, including but not limited to, a touch screen, foot pedal, lever, joystick, switch, button, or other. Accordingly, in some implementations, such a feature may be disabled or enabled at an operator's discretion. For example, it may be beneficial to disable such a feature during service of the machine. In another step of a method 500, an operator inputted one touch lift or lower request may be detected 504. An operator-inputted one touch lift or lower request may be via any type of operator input mechanism, including but not limited to, a touch screen, foot pedal, lever, joystick, switch, button, or other. Such an operator input may be the same operator input mechanism that is used to raise and lower the rake when the one-touch feature is disabled, although it need not be. Any configuration may be used without departing from the scope of the invention. In response to the operator request of 504, the lift actuator 124 may be commanded to move the rake 114 to the user-requested height, as shown in step 506. Such a command may be carried out by the VCU 200. The user-requested height may be the result of raising the rake 114 or lowering the rake 114. In some implementations, given the one-touch nature of the user-request, the target height of the rake 114 may be programmed into the VCU 200 prior to the request. One or more target heights may be programmed into the VCU 200 as part of the manufacturing process. Alternatively, one or more target heights may be programmed into the VCU 200 after the manufacturing process. In one or more implementations, one or more target heights may be changeable, such as via operator input.

Figure 11:
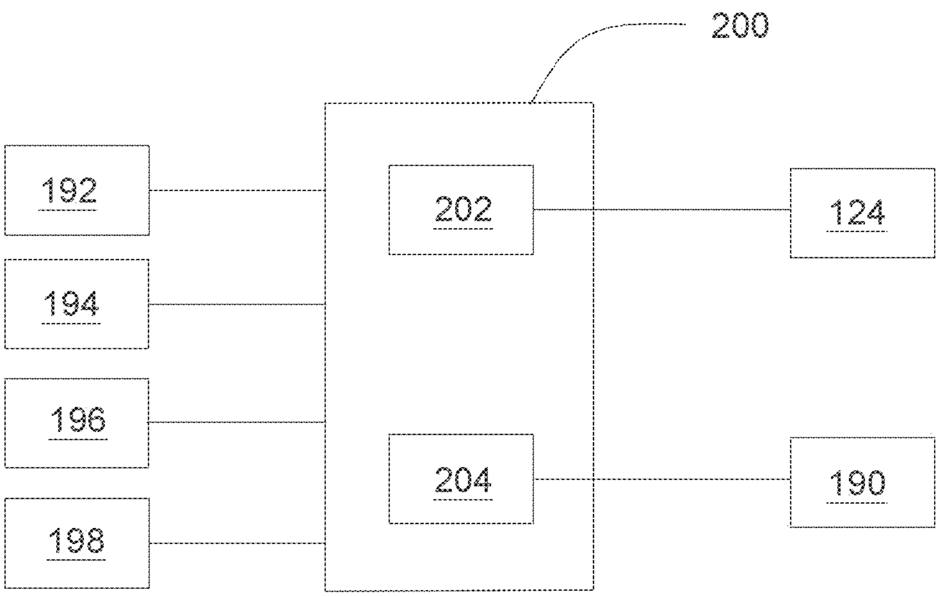
FIG. 11 is a diagram of a portion of an implementation of a sand grooming vehicle of the present invention wherein the sand grooming vehicle includes a plurality of target rake height user inputs.

In one or more implementations, systems, methods, and devices related to sand grooming vehicle 100 may include one or more target rake heights. One or more implementations may include a plurality of target rake heights. Referring to FIG. 11, a diagram is provided of at least a portion of a sand grooming vehicle 100 including a plurality of target rake heights. The sand grooming vehicle may include VCU 200, which may include at least one memory 202 and at least one processor 204, as described in detail above. Sand grooming vehicle 100 may also include lift actuator 124, as described in detail above. Further, FIG. 11 shows a plurality of target rake height user inputs 192, 194, 196, 198. Although the illustrated implementation shows four target rake height user inputs, any number of target rake height user inputs may be included without departing from the scope of the invention. By way of example only, one, two, three, five, six, seven, eight, nine, or ten target rake height user inputs may be included. Target rake height user inputs 192, 194, 196, 198 may be activated by an operator at operator station 106. Target rake height user inputs 192, 194, 196, 198 may take any form, including but not limited to, a touch screen, foot pedal, lever, joystick, switch, button, or other.

Moreover, the sand grooming vehicle may include a display unit 190. The display unit 190 may be configured to display information related to the sand grooming vehicle. Such information may include, but is not limited to, information regarding the position of the rake. Such information may further include, but is not limited to vehicle speed, vehicle gear (for example, forward or reverse), power source information (for example, battery life or remaining fuel), and any other desired information. Moreover, the VCU 200 may be configured to display information on said display unit 190. Display unit 190 may further be configured to receive input from a user, such as via a touch screen, switch, button or other. VCU may be configured to receive user input from said display unit 190. In one or more examples of implementations, the display unit 190 is a touch screen configured to both display information and receive user input. In one or more implementations, such as that shown in FIG. 11, the display unit may not include one or more user inputs.

An exemplary method related to one or more target rake heights may include a user activating a target rake height user input to request that the rake height move to the selected target rake height. The VCU 200 may then command the lift actuator 124 to move the rake 114 to the selected target rake height. A method of moving a rake to a user inputted target rake height may be combined with one or more other methods described herein. In one or more implementations, methods of moving the rake to one or more target rake heights may include using a one touch user input, such as that described above. In other implementations, the target rake height user inputs are not one touch. In one or more implementations, one or more target rake heights are set on a sand grooming vehicle 100 of the present invention during the manufacturing process. In one or more implementations, one or more target rake heights are set on a sand grooming vehicle 100 of the present invention by an operator. In one or more implementations, one or more target rake heights are changeable, such as by an operator.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A sand grooming vehicle, comprising:

a rake movable between a plurality of positions;

a first user input configured to enable one-touch movement of said rake;

a second user input capable of requesting at least one of movement of said rake to raise said rake and movement of said rake to lower said rake when said one-touch movement of said rake is disabled, and requesting movement of said rake to a predetermined rake position of said plurality of positions when said one-touch movement is enabled upon actuation by a user; and a vehicle control unit including at least one memory and at least one processor, the vehicle control unit operable to:

store at least one predetermined rake position;

detect actuation of said first user input to enable one-touch movement of said rake;

detect actuation of said second user input; and if said on-touch movement of said rake is enabled, command movement of said rake to said predetermined rake position without continued actuation of said one-touch user input by said user.

2. The sand grooming vehicle of claim 1, wherein said rake position is a rake height.

3. The sand grooming vehicle of claim 2, further comprising a plurality of one-touch user inputs configured to request movement of said rake to a corresponding plurality of predetermined rake heights and wherein said vehicle control unit is operable to:

detect actuation of each of said plurality of one-touch user inputs; and command movement of said rake to each of said corresponding plurality of predetermined rake heights upon actuation of the corresponding one of said plurality of one-touch user inputs without continuous actuation of the corresponding one of said plurality of one-touch user inputs.

4. The sand grooming vehicle of claim 2, wherein a rake height associated with said predetermined rake position is configured to be changeable by a user.

5. The sand grooming vehicle of claim 2, wherein an actuator moves said rake between said plurality of positions.

6. The sand grooming vehicle of claim 5, wherein said actuator is an electric actuator in communication with said vehicle control unit.

7. The sand grooming vehicle of claim 6, wherein said communication is via a controller area network (CAN) bus.

8. A sand grooming vehicle, comprising:

a rake movable between a plurality of heights;

a first user input configured to enable one-touch movement of said rake;

a second user input capable of requesting movement of said rake to at least one of raise said rake and lower said rake when said one-touch movement of said rake is disabled, and if enabled, requesting movement of said rake to a predetermined rake position of said plurality of positions upon actuation by a user;

a plurality of one-touch user inputs configured to request movement of said rake to a corresponding plurality of predetermined rake heights upon actuation by a user;

a vehicle control unit including at least one memory and at least one processor, the vehicle control unit operable to:

store said plurality of predetermined rake heights;

detect actuation of said first user input to enable one-touch movement of said rake;

detect actuation of said second user input;

detect actuation of each of said plurality of one-touch user inputs; and command movement of said rake to a user-selected predetermined rake height without continued actuation of said second user input or said plurality one-touch user inputs, said user selected predetermined rake height selected through actuation of one of said second user input or one of said plurality of one-touch user inputs.

9. The sand grooming vehicle of claim 8, wherein a rake height associated with at least one of said second user input and said one-touch user inputs is configured to be changeable by a user.

10. The sand grooming vehicle of claim 8, wherein an actuator moves said rake between said plurality of heights.

11. The sand grooming vehicle of claim 10, wherein said actuator is an electric actuator in communication with said vehicle control unit.

12. The sand grooming vehicle of claim 11, wherein said communication is via a controller area network (CAN) bus.

13. A computer-implemented method of controlling a sand grooming vehicle, said sand grooming vehicle including a rake movable between a plurality of positions, the method comprising:
storing one or more predetermined rake positions;
detecting actuation of a first user input to enable one-touch movement of said rake;
detecting actuation of a second user input to raise or lower said rake when said one-touch movement of said rake is disabled;
if one-touch movement of said rake is enabled, detecting one-touch actuation of said second user input to move said rake to a predetermined rake position; and
commanding movement of said rake to said predetermined rake position without continued detection of said one-touch user input request to move said rake to said predetermined rake position.

14. The method of claim 13, further comprising:
analyzing whether the sand grooming vehicle is traveling in reverse upon detecting a one-touch user input request to move said rake to a predetermined rake position.

15. The method of claim 13, further comprising:
detecting a user-inputted reverse request.

16. A sand grooming vehicle, comprising:
a rake movable between a plurality of positions;
an actuator configured to move said rake to said plurality of positions;
a first user input configured to enable one-touch movement of said rake;
a second user input configured to request movement of said rake to a predetermined rake position of said plurality of positions when said one-touch movement is enabled; and
a vehicle control unit including at least one memory and at least one processor, the vehicle control unit operable to:
store at least one predetermined rake position;
detect actuation of said first user input to enable one-touch movement of said rake;
detect actuation of said second user input;
if said one-touch movement of said rake is enabled, determine an actuator command to move said rake to said predetermined rake position; and
if said one-touch movement of said rake is enabled, command movement of said rake to said predetermined rake position without continued actuation of said one-touch user input by said user.

17. The sand grooming vehicle of claim 16, wherein said rake position is a rake height.

18. The sand grooming vehicle of claim 17, wherein said rake height associated with said predetermined rake position is configured to be changeable by a user.

* * * * *